United States Patent [19]

McGaffin

[11] 4,013,250
[45] Mar. 22, 1977

[54] DETACHABLE CUTLERY HOOK

[76] Inventor: Andrew W. McGaffin, 282 Western Hut Road, Belmont, Lower Hut, Wellington, New Zealand

[22] Filed: Jan. 12, 1976

[21] Appl. No.: 648,021

[52] U.S. Cl. ............................... 248/37.3; 294/1 R
[51] Int. Cl.² ........................................ A47G 21/14
[58] Field of Search ............... 294/33, 1, 2, 3, 13, 294/59; 24/3 P, 3 F, 3 R, DIG. 12; 224/45 C, 45 T, 45 W; 248/37.3, 37.6

[56] References Cited

UNITED STATES PATENTS

| 975,858 | 11/1910 | Guy | 248/37.3 |
| 1,182,732 | 5/1916 | Avery | 248/37.6 |
| 2,298,901 | 10/1942 | Pickering | 248/37.6 |
| 2,605,624 | 8/1952 | Halladay | 248/37.6 |

FOREIGN PATENTS OR APPLICATIONS

| 801,575 | 8/1936 | France | 248/37.3 |
| 402,191 | 8/1909 | France | 294/3 |

Primary Examiner—James B. Marbert
Attorney, Agent, or Firm—Pasquale A. Razzano

[57] ABSTRACT

The cutlery hook consists of a one-piece curved member which is generally U-shaped in side view and has a first free end portion that includes a pair of resilient wall elements inclined towards each other to define therebetween a generally triangular space adapted to receive the end of a cutlery utensil in a frictional resilient engagement. An insert element is provided for mounting on the end of the cutlery hook between the inclined resilient walls for urging the cutlery utensil into tight frictional engagement with those walls. The hook serves to prevent the utensil from sliding into the pot or bowl in which it is placed, and can cooperate with a similar hook and cutlery utensil to form food service tongs.

8 Claims, 6 Drawing Figures

U.S. Patent   Mar. 22, 1977   4,013,250
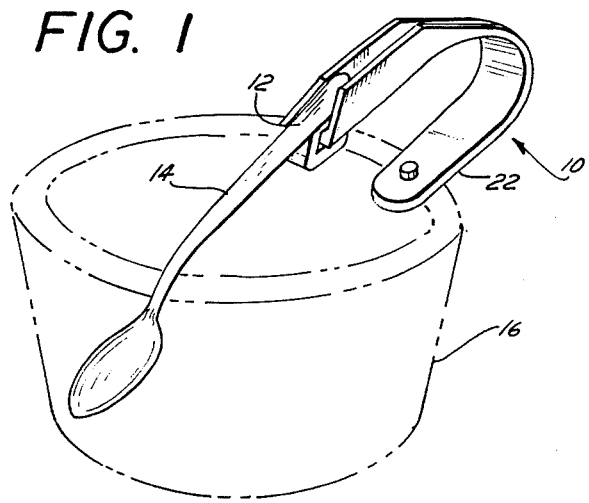
FIG. 1
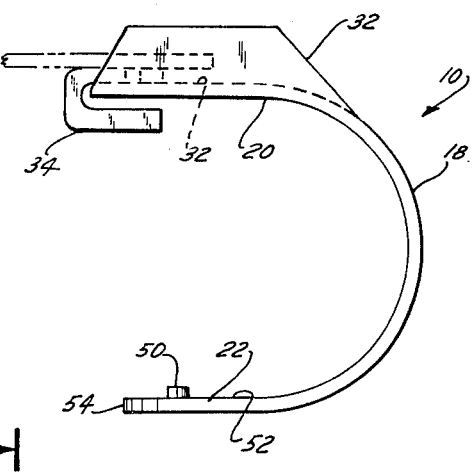
FIG. 2
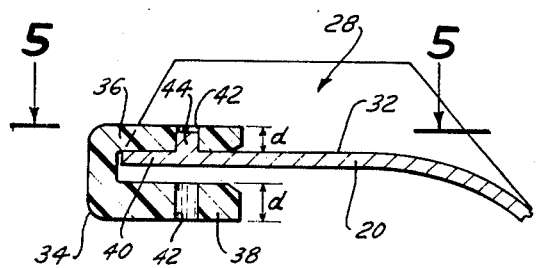
FIG. 3
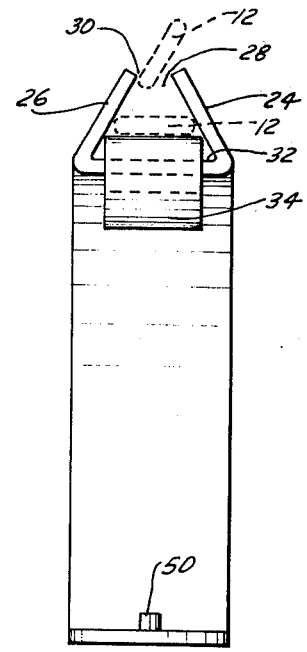
FIG. 4
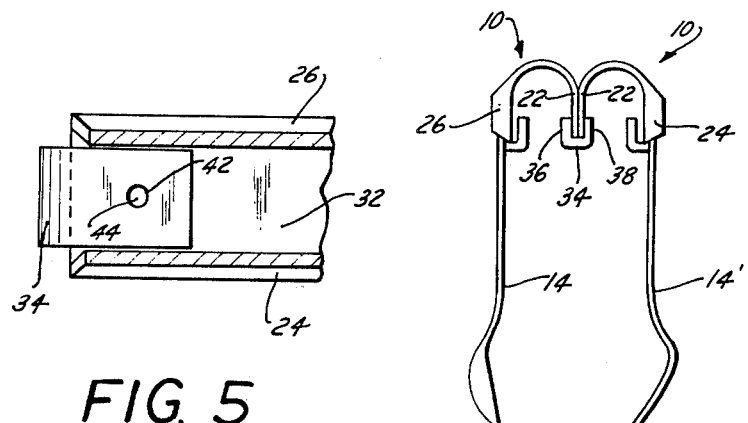
FIG. 5
FIG. 6

DETACHABLE CUTLERY HOOK

The present invention relates to a cutlery utensil, and in particular to a cutlery hook used with a utensil to prevent the utensil from sliding into the pot or bowl in which it is placed.

It is an object of the present invention to provide an adapter element for use with a cutlery utensil, such as a spoon or a fork, which will prevent the utensil from sliding into a bowl or pot in which it is placed.

It is another object of the present invention to provide a cutlery hook of the character described which is adapted to cooperate with a similar cutlery hook to form food service tongs.

Another object of the present invention is to provide a cutlery hook of the character described which is adapted to accommodate varying sized cutlery utensils.

A still further object of the present invention is to provide a cutlery hook of the character described which is relatively inexpensive to manufacture and yet is durable in use.

In accordance with an aspect of the present invention the cutlery hook consists of a one-piece curved member having a generally U-shaped configuration, in side view, which includes first and second opposed free end portions. The first end portion of the hook has a pair of inclined resilient wall elements formed integrally therewith that are inclined towards one another in order to define therebetween a generally triangularly shaped space. The handle end of a cutlery utensil is adapted to be inserted into this triangular space in frictional engagement between the resiliently inclined walls which serve to hold the hook on the end of the utensil. In this manner, when the utensil is placed in a bowl or pot, the hook will prevent the utensil from sliding down into the bowl or pot.

In accordance with a further feature of the invention an insert element is provided which is adapted to be mounted on the first end portion of the cutlery hook between the resilient wall elements for urging the cutlery utensil into tight frictional engagement between the walls. This allows the cutlery hook of the invention to be used with a larger variety of cutlery utensils. In addition, the insert or staple element is adapted to cooperate with a additional cutlery hook, having a cutlery utensil mounted therein, in order to connect two cutlery hook together to form food service tongs.

The above, and other objects, features and advantages of this invention will be apparent in the following detailed description of an illustrative embodiment thereof, which is to be read in connection with the accompanying drawings, wherein:

FIG. 1 is a perspective view of a cutlery hook constructed in accordance with the present invention holding a cutlery utensil therein and placed within a bowl, shown in phantom lines;

FIG. 2 is a side view of the cutlery hook illustrated in FIG. 1;

FIG. 3 is a slightly enlarged side view, similar to FIG. 2, but taken in section;

FIG. 4 is an end view taken along lines 4—4 of FIG. 2;

FIG. 5 is a top plan view taken along line 5—5 in FIG. 3; and

FIG. 6 is a plan view, on a reduced scale, of a pair of cutlery hooks constructed in accordance with the present invention and connected by a staple element to form a set of food service tongs.

Referring now to the drawing in detail, and initially to FIG. 1 thereof, it will be seen that a cutlery hook 10, constructed in accordance with the present invention is adapted to be secured to the end 12 of a cutlery utensil 14, such as for example a spoon or a fork. The cutlery hook, when secured to the utensil as described hereinafter, will prevent the utensil from sliding downwardly into the pot or bowl in which it is placed. It is noted that in FIG. 1 a bowl 16 is shown in phantom lines in order to illustrate a function of the hook. In this position, one leg of the generally U-shaped hook will be located outside of the pot or bowl, and thus will engage the side wall of the bowl should the utensil 14 tend to slide down into the bowl, thereby preventing further movement of the utensil in the bowl.

Cutlery hook 10 is a generally U-shaped element in side view, as seen most clearly in FIG. 2, which is formed of one piece of resilient material such as for example stainless steel or plastic. The hook 10 has a curved central portion 18 and a pair of leg portions 20, 22. The leg portion 20 includes a pair of integrally formed inclined walls 24, 26 (see FIG. 4) which incline towards each other to form a generally triangularly shaped space 28 therebetween. Walls 24, 26 terminate short of each other in order to form a space 30 between their upper edges. In addition, these walls taper in any convenient manner along their rear edges 32 to the surface of the curved portion 18 of the hook.

In use, the end 12 of a cutlery utensil is inserted in the space 28 by initially tilting the cutlery utensil, as illustrated in dotted lines in FIG. 4, at an angle to allow the side edge of the utensil to slip through the opening 30 between the edges of the wall 24, 26. When the utensil is inserted it is rotated back to a horizontal position so that it lies in substantially the same plane as the bottom wall 32 of space 28. Since walls 24, 26 are formed of the same resilient material of which the entire hook is formed, they will resiliently engage the side edges of the cutlery utensil in order to frictionally hold the utensil in space 28. With the hook secured to the cutlery utensil in this manner, the utensil can be placed in a bowl or pot, with the leg 22 of the utensil on the outside of the pot, so that that leg engages the outside of the pot and prevents the utensil from sliding down into the pot. It will be appreciated that if the pot or bowl is deep enough, the bight or curved portion 18 of the cutlery hook will rest against the upper edge of the bowl and act as a hanger element supporting the utensil in a generally vertical position within the bowl.

In order to allow the cutlery hook to accommodate cutlery utensils of various sizes, an insert or staple element 34 is provided. As seen in FIG. 3 the staple element 34 has a generally U-shaped configuration and includes a pair of flat leg elements 36, 38. Preferably these leg elements have a different width dimension $d$.

Staple 34 is adapted to be secured to the free end 40 of the leg 20, as illustrated in FIGS. 2 and 3. For this reason the legs of the staple are provided with apertures 42 formed therein that are adapted to receive a stud or projection 44 formed on the lower wall 32 of recess 28. The staple is formed of sufficiently resilient material so that when the user slides one leg of the staple into the space 28, the staple can bend upwardly over stud 44 to allow the stud to enter recess 42. As seen in FIG. 4, by placing staple 34 in the recess 28, the base of the triangular recess is effectively raised, so that the end 12 of any utensil placed in the recess is moved upwardly in the recess in tight frictional engagement with the inclined walls 24, 26. Thus the utensil is firmly held between these walls.

By making legs 36, 38 of the staple of different thicknesses $d$, the leg which is most suitable for holding the cutlery utensil being used in the space 28 can be utilized. Thus for example in the illustrative embodiment of the invention if a cutlery utensil is used which has a width dimension between its side edges that is smaller than the cutlery utensil illustrated in dotted lines in FIG. 4, the staple 34 can be removed and inverted so that the thicker leg 38 is placed within space 28, thus raising the end of the utensil further upwardly in the space into engagement with the side walls 24, 26. The cutlery utensil with the hook 10 secured thereto, in this manner can then be placed in a pot or bowl without fear of the utensil falling into the food contained within the pot.

In accordance with another feature of the present invention the cutlery hook 10 is adapted to cooperate with a similar or identical cutlery hook in order to form food service tongs. As illustrated in FIG. 6, a pair of cutlery hooks 10 are provided and positioned with their legs 22 adjacent each other. These legs each have a stud element 50 (see FIG. 2) formed on their inner surface 52. With this arrangement the two hook members 10 can be secured to each other by the use of a staple 34 which is placed over the free ends 54 of the legs 22 so that one stud element 50 is received in each of the openings 42 of the legs 36, 38 thereof respectively. With appropriate cutlery utensils such as the spoon 14 and fork 14' illustrated in FIG. 6 received in and frictionally held between the inclined walls 24, 26 of the two connected cutlery hooks, in the manner previously described, the resulting assembly forms food service tongs. Of course when the tongs are not needed, the utensils 14, 14' are simply removed from the hooks 10 to allow them to perform their normal function. Because the hooks are formed of a resilient material, e.g. either stainless steel or plastic, aluminum or the like, the tongs are flexible at the hooks, so that they operate satisfactorily.

Accordingly, it is seen that a relatively simply constructed cutlery arrangement is provided which is durable in construction and yet economical to manufacture. The hook is adapted to prevent a utensil secured thereto from inadvertently falling into the pot or bowl in which it is placed, and has the additional feature that when combined with a similar cutlery hook can form a pair of food service tongs with the appropriate cutlery utensils.

Although an illustrative embodiment of the present invention has been described herein with reference to the accompanying drawings, it is to be understood that various changes and modifications may be effected therein by one skilled in the art without departing from the scope or spirit of this invention.

What is claimed is:

1. A cutlery hook comprising a one piece curved member having first and second end portions, said first end portion including a pair of resilient wall elements inclined towards each other to define therebetween a generally triangular space for receiving the end of a cutlery utensil in frictional engagement between said walls; an insert element, and cooperating means on said insert element and said first end portion of said one piece curved member for removably securing said insert element on said first end portion between said inclined walls to urge said utensil into tight frictional engagement with said walls.

2. A cutlery hook as defined in claim 1 wherein said one piece member is generally U-shaped in side view.

3. A cutlery hook as defined in claim 2 wherein said insert element is generally U-shaped.

4. A cutlery hook as defined in claim 3 wherein said cooperating means comprises a stud integrally formed with said one piece member between said inclined walls and an aperture for receiving said stud formed in at least one of the legs of said insert whereby said one leg may be inserted between said inclined walls with said aperture receiving said stud for securing the insert to said one piece element.

5. A cutlery hook as defined in claim 4 wherein one of said lgs of said insert element is thicker than the other and has a similar aperture formed therein whereby either leg of said insert may be inserted between said inclined walls.

6. A cutlery hook as defined in claim 5 wherein said second end portion of said one piece member has a stud formed thereon for cooperative engagement with at least one of the apertures in said insert legs to selectively secure said insert thereto.

7. A cutlery hook as defined in claim 6 wherein said one piece member is formed from a material selected from the group consisting of aluminum, stainless steel and plastic.

8. A cutlery hook as defined in claim 7 including at least one additional one-piece U-shaped member and one additional U-shaped insert; the aperture in said additional U-shaped insert respectively receiving the studs on the second end portions of said U-shaped members to form resilient tongs when cutlery utensils are placed in the first end portions thereof.

* * * * *